(12) United States Patent
Lun

(10) Patent No.: US 6,883,649 B2
(45) Date of Patent: Apr. 26, 2005

(54) CLOSING SYSTEM FOR A MAGNETO-RHEOLOGICAL DAMPER

(75) Inventor: Saiman Lun, Centerville, OH (US)

(73) Assignee: Delphi Technologies, Inc., Troy, MI (US)

( * ) Notice: Subject to any disclaimer, the term of this patent is extended or adjusted under 35 U.S.C. 154(b) by 106 days.

(21) Appl. No.: 10/394,103

(22) Filed: Mar. 21, 2003

(65) Prior Publication Data

US 2004/0182661 A1 Sep. 23, 2004

(51) Int. Cl.[7] ................................................. F16F 9/53
(52) U.S. Cl. ............... 188/267.2; 188/267; 188/322.17
(58) Field of Search ............................. 188/267, 267.1, 188/267.2, 322.16, 322.17; 92/165 R, 168

(56) References Cited

U.S. PATENT DOCUMENTS

| | | | | |
|---|---|---|---|---|
| 3,771,629 | A | * | 11/1973 | Fader et al. ............ 188/322.17 |
| 3,791,495 | A | * | 2/1974 | Keijzer et al. ......... 188/322.17 |
| 4,079,925 | A | * | 3/1978 | Salin .......................... 267/129 |
| 4,735,402 | A | * | 4/1988 | Davis ....................... 267/64.13 |
| 5,878,851 | A | * | 3/1999 | Carlson et al. ............. 188/269 |
| 6,260,675 | B1 | | 7/2001 | Muhlenkamp |
| 6,279,700 | B1 | | 8/2001 | Lisenker et al. |
| 6,279,701 | B1 | | 8/2001 | Namuduri et al. |
| 6,290,033 | B1 | | 9/2001 | Oliver |
| 6,311,810 | B1 | | 11/2001 | Hopkins et al. |
| 6,318,519 | B1 | | 11/2001 | Kruckmeyer et al. |
| 6,318,520 | B1 | | 11/2001 | Lisenker et al. |
| 6,336,535 | B1 | | 1/2002 | Lisenker |
| 6,345,706 | B1 | | 2/2002 | Oliver et al. |
| 6,382,369 | B1 | | 5/2002 | Lisenker |
| 6,390,252 | B1 | | 5/2002 | Namuduri et al. |
| 6,394,239 | B1 | * | 5/2002 | Carlson .................... 188/267.2 |
| 6,419,057 | B1 | | 7/2002 | Oliver et al. |
| 6,419,058 | B1 | | 7/2002 | Oliver et al. |
| 6,422,360 | B1 | | 7/2002 | Oliver et al. |
| 6,460,662 | B2 | * | 10/2002 | Niaura et al. ............ 188/267.1 |
| 6,464,049 | B2 | | 10/2002 | Lisenker |
| 6,464,050 | B2 | | 10/2002 | Smith, Jr. et al. |
| 6,464,051 | B2 | | 10/2002 | Lisenker et al. |
| 6,497,308 | B2 | | 12/2002 | Lisenker |
| 6,497,309 | B1 | | 12/2002 | Lisenker |
| 6,547,043 | B2 | | 4/2003 | Card |
| 6,547,044 | B2 | | 4/2003 | Lisenker et al. |
| 6,612,409 | B2 | | 9/2003 | Lun et al. |
| 6,637,556 | B1 | | 10/2003 | Lun |
| 6,637,558 | B2 | | 10/2003 | Oliver et al. |

* cited by examiner

Primary Examiner—Douglas C. Butler
Assistant Examiner—Bradley King
(74) Attorney, Agent, or Firm—Michael D. Smith

(57) ABSTRACT

A closing system for use with a magneto-rheological (MR) damper. The closing system provides lubrication for a piston rod without a need for periodic replenishment. According to an embodiment of the present invention, a lubrication chamber of the closing system utilizes a carrier fluid portion of MR fluid present in a fluid reservoir of the damper as lubricant for a piston rod guide and the piston rod. A seal retainer comprised of a porous material acts as a selective barrier to the micro-particles in the MR fluid in the fluid reservoir, allowing the MR carrier fluid portion to pass through the porous seal retainer to the lubrication chamber while restraining the micro-particles in the fluid reservoir. The seal retainer thus acts as a filter to segregate the abrasive particles of the MR fluid and allows the MR carrier fluid portion of the MR fluid to continuously replenish the lubrication chamber and lubrication passage to lubricate the piston rod guide and piston rod.

21 Claims, 3 Drawing Sheets

CLOSING SYSTEM FOR A MAGNETO-RHEOLOGICAL DAMPER

TECHNICAL FIELD

The present invention relates to the field of magneto-rheological (MR) damping devices. In particular, the present invention relates to a closing system for an MR damper.

BACKGROUND OF THE INVENTION

Hydraulic dampers are used in many situations where it is desired to isolate sources of vibration or to protect sensitive equipment from shock and vibration. Examples include, but are not limited to, industrial equipment and machinery isolators; industrial robotics; building, bridge and ship isolators; military weapons systems; agricultural equipment; and construction equipment. Hydraulic dampers are also often used as mounts to control movement of vehicle powertrains in response to forces, such as reaction torque and vibration. The mounts also isolate engine vibration from the body of the vehicle.

A well-known type of hydraulic vibration damper is a magneto-rheological ("MR") damper, which utilizes magneto-rheological (MR) fluids in conjunction with at least one magnetic field generating device. MR fluids typically comprise ferromagnetic micro-particles suspended in a low viscosity carrier fluid. When the MR fluid is exposed to a magnetic field, the micro-particles suspended in the carrier fluid align in a chain-like structure parallel to the applied magnetic field, resulting in an increase in the apparent viscosity of the fluid. The apparent viscosity of the MR fluid increases in proportion to the strength of the magnetic field. Thus, the damping effect of the shock absorber can be adjusted by varying the strength of the applied magnetic field.

Adjustable shock absorbers utilizing MR fluids and magnetic field generating devices used in motor vehicles are typically a single- or dual-cylinder design having a cylindrical housing, a piston slideably within the housing, a piston rod connected to the piston, a fluid reservoir located within the housing and containing MR fluid, a magnetic field generating device, a series of valves to control MR fluid flow within the housing, and at least one closing system. The closing system is located on at least one end of the damper housing. The functions of the closing system include, but are not limited to, providing a piston rod guide to support reciprocal motion of the piston rod, providing lubrication for the piston rod, retaining the MR fluid within the fluid reservoir, and preventing foreign contaminants from entering the damper.

Lubrication of the piston rod is desirable to facilitate smooth actuation of the piston assembly, reduce heat generation, reduce wear, and extend the life of the damper. Unfortunately, lubricating systems are cumbersome, adding to the cost of the damper. In addition, the constant motion of the piston rod when the damper is in service will eventually exhaust the lubricant due to limitations inherent in piston rod seals that permit small amounts of lubricant to escape around the piston rod seal. MR fluid may be used as a lubricant, as the carrier fluid portion of MR fluid is a suitable lubricant. However, the micro-particles in the MR fluid can have an abrasive effect on the piston rod and piston rod guide as the piston rod moves reciprocally in the piston rod guide. Accordingly, there is a need for a simple lubricating and sealing system for MR dampers that will provide long life, reduced wear, and adequate lubrication of the piston rod without the need to periodically replenish the lubricant.

SUMMARY OF THE INVENTION

The present invention is a closing system for use with an MR damper. The closing system provides lubrication for a piston rod without the need for periodic replenishment of the lubricant. According to an embodiment of the present invention, a lubrication chamber and a lubrication passage contain a carrier fluid portion of MR fluid from an adjacent MR fluid reservoir of the damper to lubricate the piston rod guide and piston rod. A seal retainer comprised of a porous material acts as a selective barrier between the MR fluid reservoir and the lubrication chamber, allowing the MR carrier fluid to pass through the porous retainer seal to the lubrication chamber while restraining the micro-particles in the fluid reservoir. The seal retainer thus acts as a filter to segregate the abrasive particles of the MR fluid and allow the MR carrier fluid portion to replenish the lubrication chamber continuously, thereby lubricating the reciprocating piston rod.

The seal retainer may be comprised of any suitable materials compatible with MR fluid, but is preferably made from powdered metal. The powdered metal is compacted to a particular range of density to achieve a porosity determined by the size of the micro-particles in the MR fluid. The desired porosity is such that the MR carrier fluid is able to pass through the seal retainer while the micro-particles are restrained. The resulting closing system contains no moving parts and has no need for a separate lubricating fluid.

SUMMARY OF THE DRAWINGS

Further features of the present invention will become apparent to those skilled in the art to which the present embodiments relate from reading the following specification and claims with reference to the accompanying drawings, in which:

DESCRIPTION OF THE PREFERRED EMBODIMENTS

Figure 1:
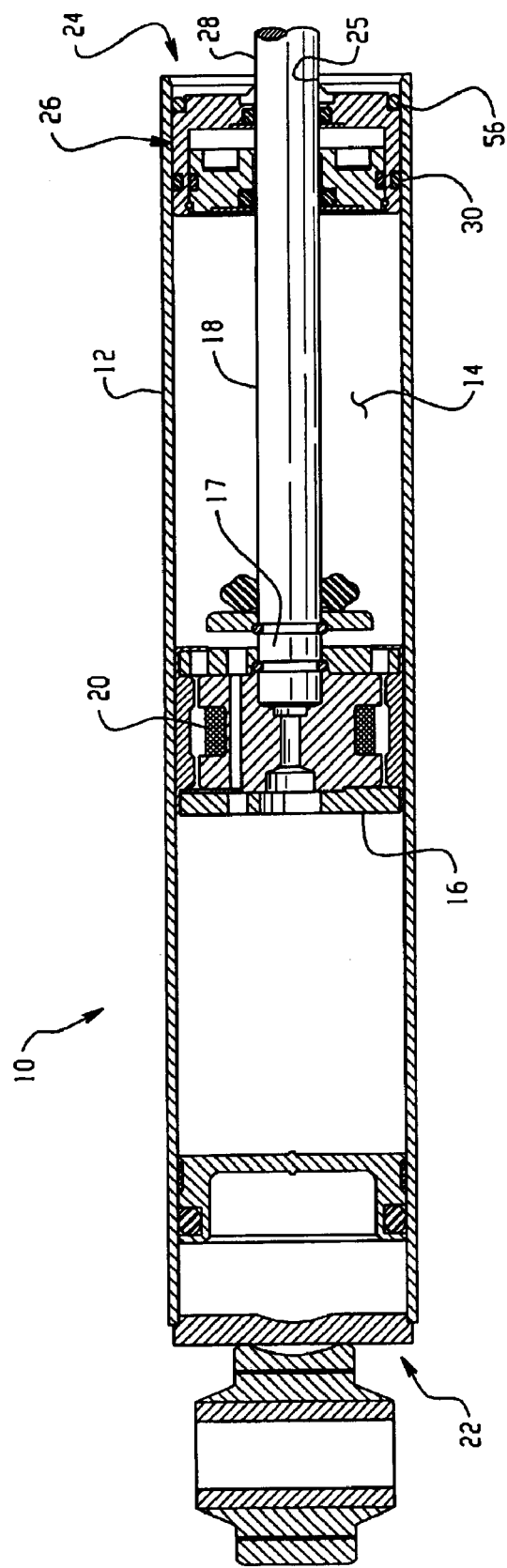
FIG. 1 is a cross-sectional view of a typical MR fluid damper.

In the description which follows, like parts are marked throughout the specification and drawings with the same reference numerals. The drawing FIGURES are not necessarily to scale in the interest of clarity and conciseness.

FIG. 1 illustrates a typical linearly acting MR fluid damper 10. The damper 10 comprises a cylindrical housing 12 having a fluid reservoir 14 adapted to contain MR fluid, a piston 16 slideably moveable within the housing, and a piston rod 18 having a first end 17 attached to the piston. The damper 10 further comprises a magnetic field generating device 20 located within the piston 16. The housing 12 has a first end 22 and a second end 24. The first end 22 of the housing 12 is adapted to be connected to a mounting point, such as a suspension arm. The second end 24 of housing 12 comprises an opening 25 through which a second end 28 of piston rod 18 partially protrudes. The second end 28 of piston rod 18 may be adapted to connect to a vehicle frame.

A closing system 26 supports reciprocal linear travel of the piston rod 18 and also retains the MR fluid within the fluid reservoir 14 while keeping out contaminants such as dust and dirt, to which the piston rod end 28 may be exposed. The closing system 26 is attached to the housing 12 by a retaining ring 30 and provides a fluid tight system with an O-ring 56.

Figure 2:
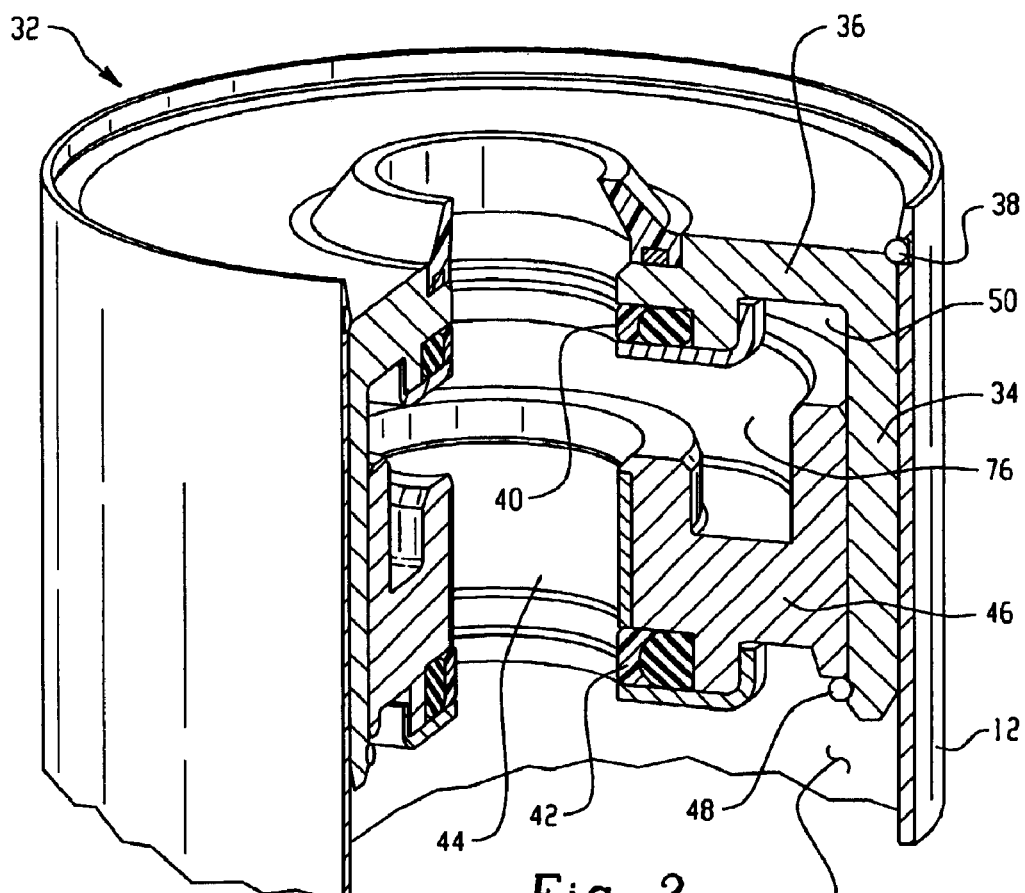
FIG. 2 is a cross-sectional view of a prior art closing system of an MR fluid damper.

FIG. 2 illustrates a prior art closing system 32 for an MR fluid damper. The closing system 32 comprises a piston rod guide retainer 34 attached to a cylindrical housing 12 via a retaining ring 38. An O-ring 40 located at an upper portion 36 of the piston rod guide retainer 34 acts with a piston rod guide 46 having a first seal 42 to provide a fluid-tight system for a piston rod (not shown for clarity). The piston rod guide 46 is slidably fitted to an inner circumference of the piston rod guide retainer 34. The range of travel of the piston rod guide 46 is limited at a first end by upper portion 36 of piston rod guide retainer 34 and at a second end by a retainer clip 48. A lubrication chamber 50 is delimited by upper portion 36 of piston rod guide retainer 34 and a channel 76 of piston rod guide 46. The lubrication chamber 50 is pre-filled with a dedicated, sacrificial lubricating fluid to aid smooth reciprocal travel of the piston rod 18. The pressure of the lubrication chamber 50 is the same as that of the MR fluid in the fluid reservoir 14 of housing 12. As the sacrificial lubricating fluid is slowly expended due to the motion of the piston rod 18, the volume of the lubrication chamber 50 is decreased due to movement of the piston rod guide 46 toward the upper portion 36 of the rod guide retainer 34 in response to pressure exerted by the MR fluid reservoir 14, equalizing the pressure of the lubrication chamber 50 and fluid reservoir.

Figure 3:
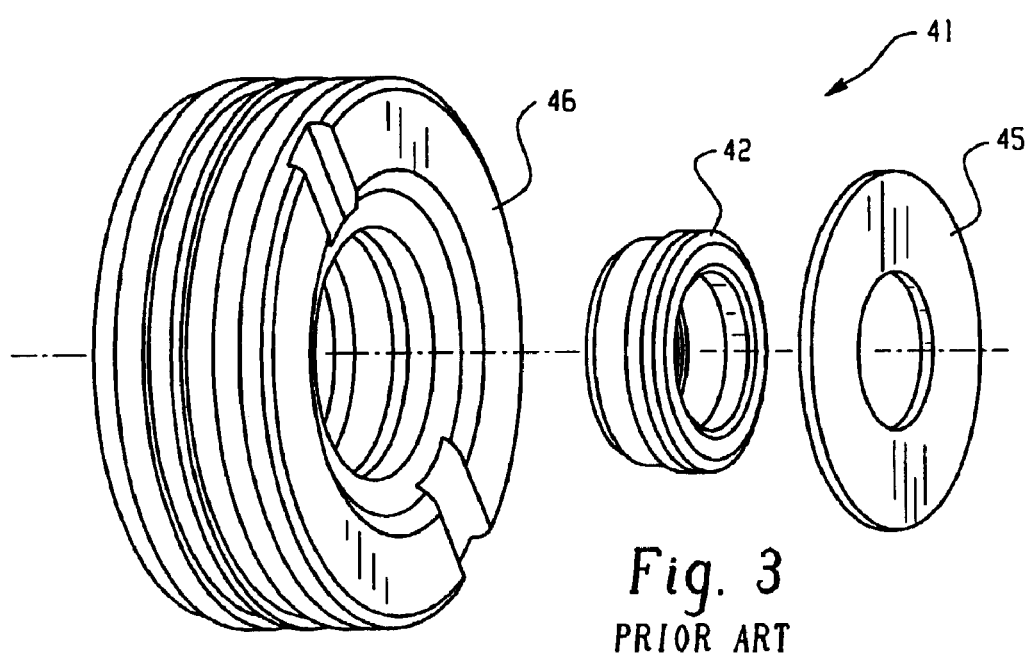
FIG. 3 is an exploded view of another prior art closing system.

Another prior art closing system 41 is shown in FIG. 3. A piston rod seal 42 fits into a piston rod guide 46 and is held in place by a retainer 45. The piston rod guide typically has a coating of polytetrafluoroethylene ("PTFE") material to aid smooth movement of a piston rod (not shown). The piston rod fits slidably through an inner diameter of the assembled closing system 41, the retainer 45 being in communication with an MR fluid reservoir (not shown) of an MR damper. In operation, reciprocating motion of the piston rod causes MR fluid to migrate into the piston rod guide 46, where it is retained by seal 42 to prevent leakage of MR fluid from the damper. A disadvantage of this closing system is that the reciprocating motion of the piston rod causes the micro-particles present in the MR fluid to have an abrasive effect on the seal 42, reducing the service life of the damper.

Figure 4:
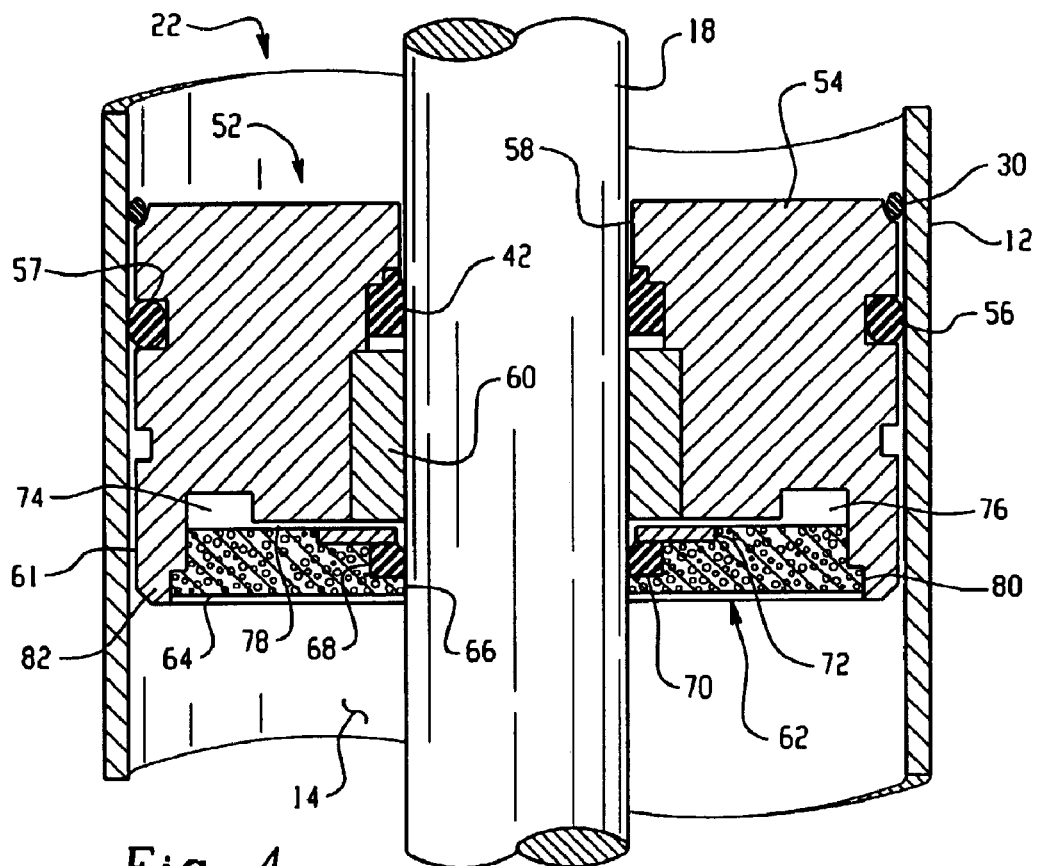
FIG. 4 is a cross-sectional view of a closing system according to an embodiment of the present invention.
Figure 5:
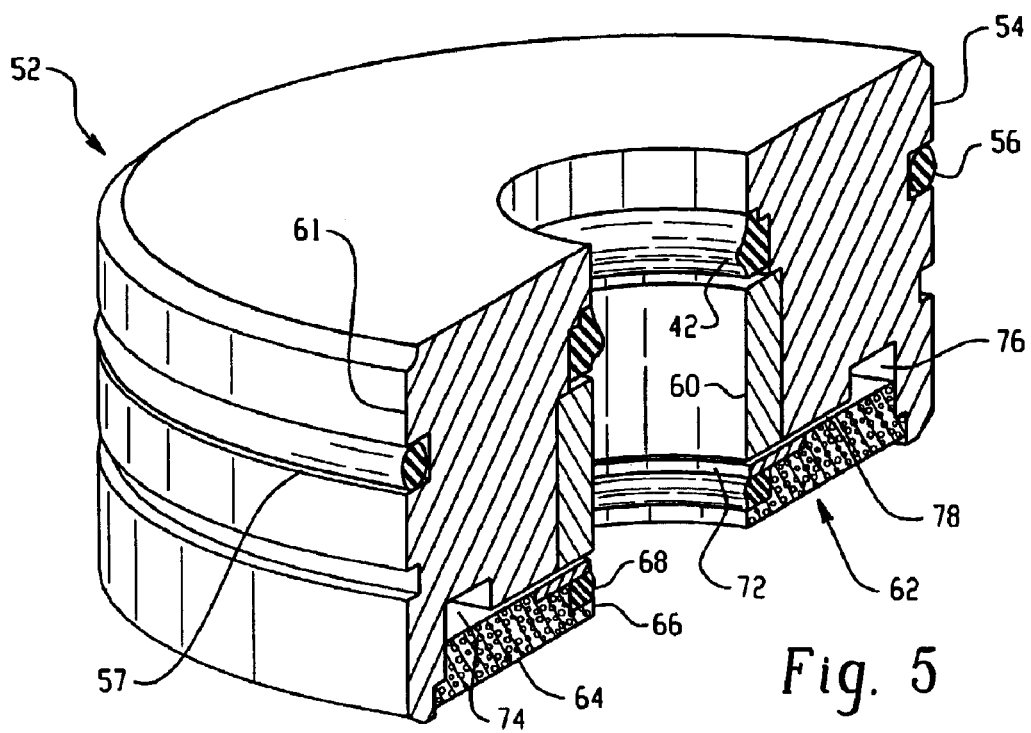
FIG. 5 is an isometric cutaway view of a closing system according to an embodiment of the present invention.

FIGS. 4 and 5 illustrate a closing system 52 for an MR fluid damper according to an embodiment of the present invention. The closing system 52 comprises a generally annular body 54 having an O-ring gland 57 located on an outer diameter 61. An O-ring seal 56 is located in the O-ring gland 57 and contacts an inner diameter of a cylindrical housing 12 to provide a fluid-tight seal. The body 54 is connected to the inner diameter of housing 12 by means of a retaining ring 30 located on top of the body 54.

The body 54 further comprises a receptacle 58 to allow for reciprocal travel of the piston rod 18, coaxial to the housing 12. A first piston rod seal 42 is provided within the receptacle 58 and is positioned between the body 54 and piston rod 18 to provide a fluid-tight seal for the piston rod. A low-friction piston rod guide 60 is also provided within receptacle 58. An outer diameter of piston rod guide 60 is adapted to connect with receptacle 58, while an inner diameter is shaped to couple to the piston rod 18 and support reciprocal travel of the piston rod. The piston rod guide 60 may be made of any suitable material, such as metal and composite materials. In addition, the piston rod guide 60 may be coated with PTFE material to further aid in the smooth movement of the piston rod 18.

A generally annular seal assembly 62 comprises a seal retainer 64 having an outer diameter 80 adapted to couple to a lip 82 of body 54. Seal assembly 62 may be coupled to body 54 by any convenient means, such as a press-fit, adhesives, staking, welding, crimping, molding and fasteners. An inner diameter 66 of retainer 64 is adapted to couple with piston rod 18. The seal retainer 64 is also adapted to hold a second piston rod seal 68 captively in a cavity 70 delimited by seal retainer 64 and a seal cover 72. The second piston rod seal 68 may be annular and/or elastomeric. Seal cover 72 may be attached to seal retainer 64 by any convenient means, such as a press-fit, adhesives, staking, welding, crimping, molding and fasteners. Second piston rod seal 68 is connected between seal retainer 64 and piston rod 18, preventing MR fluid in fluid reservoir 14 from entering lubrication passage 78.

A lubrication chamber 74 is bounded by a channel 76 of body 54 in combination with seal retainer 64. A lubrication passage 78, delimited by body 54 and seal assembly 62, is in communication with lubrication chamber 74 and piston rod 18. The lubrication chamber 74 may be filled with a suitable lubricant during assembly of the closing system 52. A lubricant having high lubricity and low volatility for low friction and durability is preferred, such as the carrier fluid portion of MR fluid. Other examples of lubricants are left to the artisan. Lubricant in lubrication chamber 74 flows into lubrication passage 78 to lubricate the inner diameter of piston rod guide 60 and aid smooth reciprocal motion of the piston rod 18.

The seal retainer 64 is made from a porous material that is compatible with MR fluid, preferably powdered metal. The powdered metal used may be of any composition used by those skilled in the art, but is preferably bronze or iron. The desired porosity is such that the carrier fluid portion of the MR fluid is able to pass through the retainer while the micro-particles in the MR fluid are restrained. For example, a desired porosity may be achieved by compacting the powdered metal to a relative density of at least 70% of that of the solid base metal. In a preferred embodiment the relative density is 70–90% of that of the solid base metal. The seal retainer may be heat treated if desired, to achieve higher fatigue strength.

As previously discussed, the MR fluid is comprised of ferromagnetic micro-particles suspended in a low viscosity MR carrier fluid. The MR carrier fluid portion exhibits lubricating properties suitable for use as a lubricant for the piston rod 18. However, the micro-particles must first be removed from the MR carrier fluid in order to make the fluid usable as a lubricant. The porous seal retainer 64 fulfills this need by restraining the micro-particles in the fluid reservoir 14 while allowing the MR carrier fluid portion to pass into the lubrication chamber 74. The MR carrier fluid is thus available to lubricate piston rod 18 and piston rod guide 60 within closing system 52 as the piston rod moves reciprocally in response to vibration disturbances. As the MR carrier fluid is depleted from the lubrication chamber 74, a pressure drop in the lubrication chamber acts to draw additional carrier fluid from the MR fluid in fluid reservoir 14 through the porous seal retainer 64 to continuously replenish the lubrication chamber 74.

While the present invention has been illustrated by the description of an embodiment thereof, and while the embodiment has been described in considerable detail, it is not intended to restrict or in any way limit the scope of the appended claims to such detail. Additional advantages and modifications will readily appear to those skilled in the art. The invention in its broader aspect is therefore not limited to the specific details, representative apparatus, methods and illustrative examples shown and described. Accordingly, departures may be made from such details without departing from the scope or spirit of applicant's general inventive concept.

What is claimed is:

1. For use with a magneto-rheological (MR) damper wherein MR fluid in the damper comprises a carrier fluid portion and micro-particles in suspension in the carrier fluid, a closing system comprising:
   a) a body having an outer diameter, an O-ring gland in the outer diameter, a receptacle, a channel, and a lip;
   b) an O-ring seal adapted to connect with the O-ring gland;
   c) a retaining ring adapted to connect with the body and with an inner diameter of a housing of the damper, the housing having a fluid reservoir adapted to contain MR fluid;
   d) a first piston rod seal adapted to connect with the receptacle of the body;
   e) a piston rod guide having an outer diameter adapted to connect with the receptacle, and having an inner diameter shaped to slidably couple with a piston rod of the damper;
   f) a seal assembly including:
      i) a seal retainer having an outer diameter adapted to connect with the lip of the body to form a lubrication chamber, an inner diameter, and a cavity located coaxial to the inner diameter, wherein the seal retainer allows MR carrier fluid from the fluid reservoir to replenish the lubrication chamber while restraining MR micro-particles,
      ii) a second piston rod seal located in the cavity, and
      iii) a seal cover placed over the second piston rod seal, the seal cover being adapted to connect with the seal retainer and captively hold the second piston rod seal, and
   g) a lubrication passage delimited by the body and the seal assembly, the lubrication passage communicating lubricant from the lubrication chamber to the inner diameter of the piston rod guide.

2. The closing system of claim 1 wherein the seal retainer is made of a porous material compatible with MR fluid.

3. The closing system of claim 2 wherein the seal retainer is made of powdered metal.

4. The closing system of claim 3 wherein the powdered metal is compacted to a relative density of at least 70% of that of the solid base metal.

5. The closing system of claim 3 wherein the powdered metal is compacted to a relative density of about 70–90% of that of the solid base metal.

6. The closing system of claim 3 wherein the powdered metal is iron.

7. The closing system of claim 3 wherein the powdered metal is bronze.

8. The closing system of claim 3 wherein the powdered metal is heat treated.

9. The closing system of claim 1 wherein the piston rod guide is made of metal.

10. The closing system of claim 1 wherein the piston rod guide is made of composite materials.

11. The closing system of claim 1 wherein the inner diameter of the piston rod guide further includes a PTFE coating.

12. The closing system of claim 1 wherein the first seal is made of an elastomeric material.

13. The closing system of claim 1 wherein the second seal is made of an elastomeric material.

14. The closing system of claim 1 wherein the O-ring is made of an elastomeric material.

15. For use with a magneto-rheological (MR) damper wherein MR fluid in the damper comprises a carrier fluid portion and micro-particles in suspension in the carrier fluid, a closing system comprising:
   a) a body having an outer diameter, an O-ring gland in the outer diameter, a receptacle, a channel, and a lip;
   b) an O-ring seal adapted to connect with the O-ring gland;
   c) a retaining ring adapted to connect with the body and with an inner diameter of a housing of the damper, the housing having a fluid reservoir adapted to contain MR fluid;
   d) a first piston rod seal adapted to connect with the receptacle of the body;
   e) a piston rod guide having an outer diameter adapted to connect with the receptacle, and having an inner diameter shaped to slidably couple with a piston rod of the damper, the inner diameter further including a PTFE coating;
   f) a seal assembly including:
      i) a seal retainer the seal retainer having an outer diameter adapted to connect with the lip of the body to form a lubrication chamber, an inner diameter, and a cavity located coaxial to the inner diameter, wherein the seal retainer allows MR carrier fluid from the fluid reservoir to replenish the lubrication chamber while restraining MR micro-particles,
      ii) a second piston rod seal located in the cavity, and
      iii) a seal cover placed over the second piston rod seal, the seal cover being adapted to connect with the seal retainer and captively hold the second piston rod seal, and
   g) a lubrication passage delimited by the body and the seal assembly, the lubrication passage communicating lubricant from the lubrication chamber to the inner diameter of the piston rod guide.

16. The closing system of claim 1 wherein the seal assembly is connected to the body by means of a press fit.

17. The closing system of claim 1 wherein the seal assembly is connected to the body by means of staking.

18. The closing system of claim 1 wherein the seal cover is connected to the seal retainer by means of a press fit.

19. The closing system of claim 1 wherein the seal assembly is connected to the body by means of staking.

20. For use with a magneto-rheological (MR) damper wherein MR fluid in the damper comprises a carrier fluid portion and micro-particles in suspension in the carrier fluid, a closing system comprising:
   a) a body having an outer diameter, an O-ring gland in the outer diameter, a receptacle, a channel, and a lip;
   b) an O-ring seal adapted to connect with the O-ring gland;
   c) a retaining ring adapted to connect with the body and with an inner diameter of a housing of the damper, the housing having a fluid reservoir adapted to contain MR fluid;

d) a first piston rod seal adapted to connect with the receptacle of the body, the first piston rod seal being made of an elastomeric material;

e) a piston rod guide having an outer diameter adapted to connect with the receptacle, and having an inner diameter shaped to slidably couple with a piston rod of the damper, the inner diameter further including a PTFE coating;

f) a seal assembly including:
  i) a seal retainer having an outer diameter adapted to connect with the lip of the body to form a lubrication chamber, an inner diameter, and a cavity located coaxial to the inner diameter, wherein the seal retainer allows MR carrier fluid from the fluid reservoir to replenish the lubrication chamber while restraining MR micro-particles,
  ii) a second piston rod seal located in the cavity, the second piston rod seal being made of an elastomeric material, and
  iii) a seal cover placed over the second piston rod seal, the seal cover being adapted to connect with the seal retainer and captively hold the second piston rod seal, and g) a lubrication passage delimited by the body and the seal assembly, the lubrication passage communicating lubricant from the lubrication chamber to the inner diameter of the piston rod guide.

21. For use with a magneto-rheological (MR) damper wherein MR fluid in the damper comprises a carrier fluid portion and micro-particles in suspension in the carrier fluid, a closing system comprising:

a) a body adapted to couple to a housing of the damper, the housing having a fluid reservoir adapted to contain MR fluid;

b) a seal assembly including:
  i) a piston rod seal, and
  ii) a seal retainer-adapted to connect with the body to form a lubrication chamber, wherein the seal retainer allows MR carrier fluid from the fluid reservoir to replenish the lubrication chamber while restraining MR micro-particles, and c) a lubrication passage delimited by the body and the seal assembly, the lubrication passage communicating lubricant from the lubrication chamber to a piston rod of the damper.

* * * * *